(12) United States Patent
Mikhemar et al.

(10) Patent No.: US 8,824,988 B2
(45) Date of Patent: Sep. 2, 2014

(54) USING DIRECT PHASE NOISE MEASUREMENT AND BLOCKER RECOVERY TO CANCEL RECIPROCAL MIXING NOISE

(71) Applicant: Broadcom Corporation, Irvine, CA (US)

(72) Inventors: Mohyee Mikhemar, Aliso Viejo, CA (US); David Murphy, Costa Mesa, CA (US); Hooman Darabi, Laguna Niguel, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/681,333

(22) Filed: Nov. 19, 2012

(65) Prior Publication Data

US 2014/0141740 A1    May 22, 2014

(51) Int. Cl.
    *H04B 17/00*      (2006.01)
    *H04B 1/10*      (2006.01)

(52) U.S. Cl.
    CPC .................................. *H04B 1/1027* (2013.01)
    USPC ..................... 455/226.1; 455/67.13; 455/296; 455/302; 455/310; 455/317

(58) Field of Classification Search
    CPC .......... H04B 15/04; H04B 15/06; H04B 1/10; H04B 1/12; H04B 1/1661

USPC .................... 455/67.13, 226.1, 296, 310, 317
See application file for complete search history.

(56) References Cited

U.S. PATENT DOCUMENTS

| | | | | |
|---|---|---|---|---|
| 5,584,062 A | * | 12/1996 | Meador et al. ................. | 455/260 |
| 5,930,306 A | * | 7/1999 | Boie ............................. | 375/332 |
| 8,126,420 B2 | * | 2/2012 | Koroglu et al. ............... | 455/311 |
| 8,558,728 B1 | * | 10/2013 | Lemkin et al. ................ | 341/166 |
| 2006/0064260 A1 | * | 3/2006 | Stein et al. ...................... | 702/76 |
| 2011/0102246 A1 | * | 5/2011 | Moulton et al. .............. | 342/159 |
| 2012/0299651 A1 | * | 11/2012 | Goel et al. .................... | 330/185 |

* cited by examiner

*Primary Examiner* — Simon Nguyen

(74) *Attorney, Agent, or Firm* — McDermott Will & Emery LLP (57) ABSTRACT

A method for reciprocal-mixing noise cancellation may include receiving a baseband signal down-converted to baseband using a local oscillator (LO). The baseband signal may comprise a wanted signal and a reciprocal mixing noise, which at least partially overlaps the wanted signal and is due to mixing of a blocker signal with a phase noise of the LO. Blocker recovery may be performed on the baseband signal and a blocker estimate signal may be generated from the baseband signal. The phase noise of the LO may be measured and used in generating a phase noise measurement signal. The blocker estimate signal and the phase noise measurement signal may be processed to generate a reconstructed noise signal that may comprise the overlapping reciprocal mixing noise. The reconstructed noise signal may be subtracted from the baseband signal to provide the wanted signal free from to the reciprocal mixing noise.

20 Claims, 5 Drawing Sheets

USING DIRECT PHASE NOISE MEASUREMENT AND BLOCKER RECOVERY TO CANCEL RECIPROCAL MIXING NOISE

TECHNICAL FIELD

The present description relates generally to radio frequency (RF) communications, and more particularly, but not exclusively, to using direct phase noise measurement and blocker recovery to cancel reciprocal mixing noise.

BACKGROUND

The airwaves may be crowded with wireless signals, e.g., cellular signals, Wi-Fi signals, and/or other wireless signals. Accordingly, radio receivers may need to tolerate large blocker signals, e.g. unwanted signals that may interfere with a wanted signal. In addition, during down-conversion in a receiver, reciprocal mixing of the phase noise of a local oscillator (LO) with an unwanted blocker signal may deposit additive noise on top of the wanted signal. The undesirable effects of reciprocal mixing can be mitigated, in some instances, by filtering the unwanted blocker signal prior to down-conversion using sharp radio frequency (RF) filters. However, the addition of those RF filters may come at the expense of power, cost, and/or area. The undesirable effects of reciprocal mixing may also be mitigated by implementing oscillators that have minimal phase noise, such as LC-oscillators. However, the phase noise improvement of an LC-oscillator may also come at the expense of power, cost, and/or area.

The need exists for a low cost reciprocal mixing noise cancellation technique that has a potential for substantial reciprocal-mixing noise figure improvement independent of the LO phase noise.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more implementations. In one or more instances, well-known structures and components are shown in block diagram form in order to avoid obscuring the concepts of the subject technology.

Figure 1:
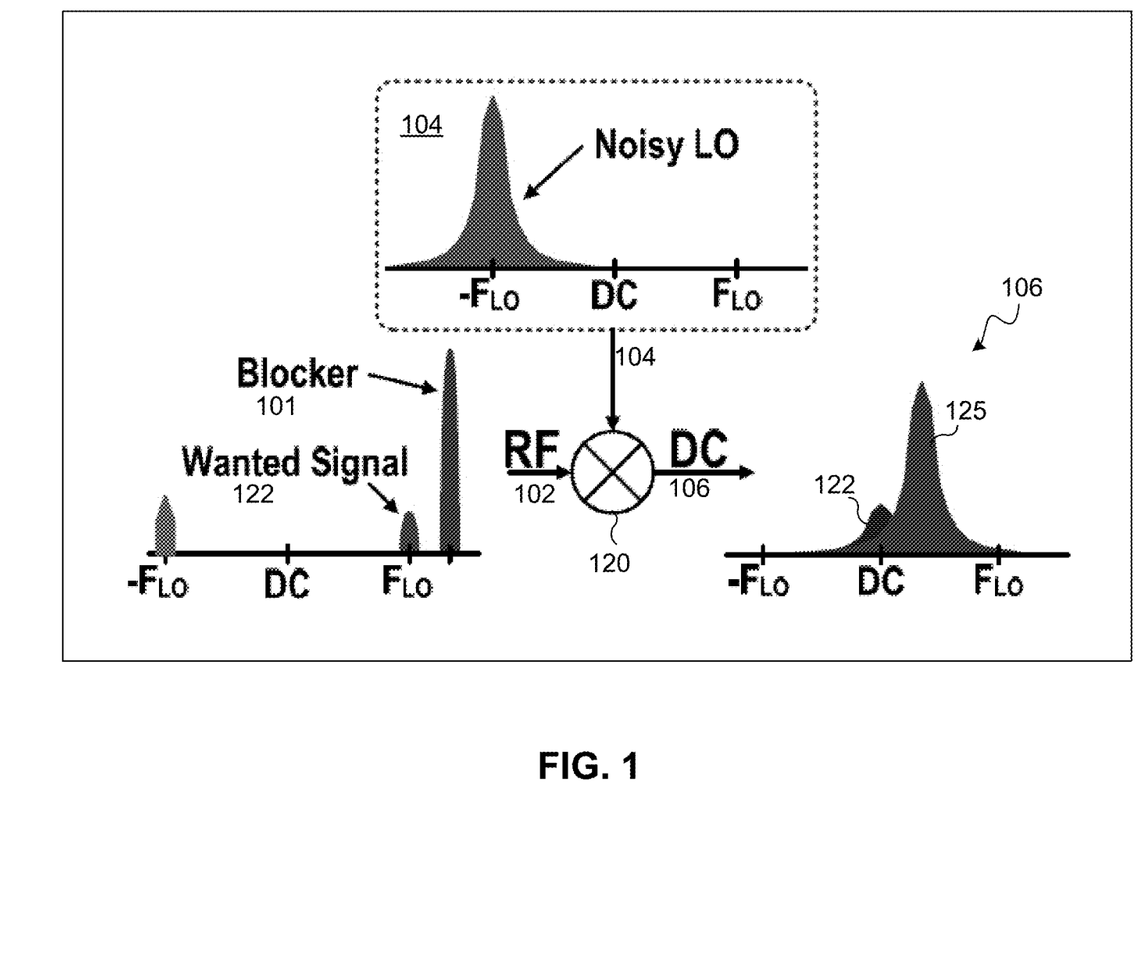
FIG. 1 illustrates an example down-conversion mixing of a radio frequency signal with a noisy local oscillator (LO) causing generation of reciprocal mixing noise.

FIG. 1 illustrates an example down-conversion mixing of a radio frequency (RF) signal 102 with a noisy local oscillator (LO) causing generation of reciprocal mixing noise. The down conversion mixer 120 may receive the RF signal 102 and mix the RF signal 102 with the LO signal 104 to generate a baseband signal 106. The RF signal may include a wanted signal 122 (e.g., desired signal) at an operating frequency of the LO (e.g., LO frequency, $F_{LO}$), a corresponding image signal at a negative frequency, $-F_{LO}$, and a narrow band blocker 101 (e.g., an unwanted signal) at an offset from the $F_{LO}$. The LO signal 104 may be a noisy LO signal with a symmetrical phase noise frequency spectrum centered at $F_{LO}$ (and also with an image spectrum at $-F_{LO}$, which is shown in FIG. 1A). The down-conversion mixer 120 may down convert the RF signal 102 to generate the baseband signal 106 at near zero frequencies (e.g., DC).

Ideally, if the LO signal 104 was noiseless, one would expect the baseband signal 106 to be a replica of the RF signal 102 (i.e., the positive frequency portion of the signal) shifted down in frequency, by an amount equal to $F_{LO}$, to DC. In practice, however, the other frequencies of the phase noise frequency spectrum of the noisy LO signal 104 may also mix with the narrow blocker 101 to generate a wideband modulated blocker signal 125 with a symmetrical reciprocal-mixing profile. The problem with this undesirable mixing is that a tail of the modulated blocker signal 125 can superimpose the wanted signal 122 (at around DC) to deposit additional noise on the wanted signal 122. The subject technology may measure the phase noise of the LO and use the measured phase noise along with a blocker estimate signal to cancel the overlapping reciprocal mixing noise, as disclosed herein, and provide the wanted signal substantially free from to the reciprocal mixing noise, at significant advantage with respect to the existing solutions.

Figure 2A:
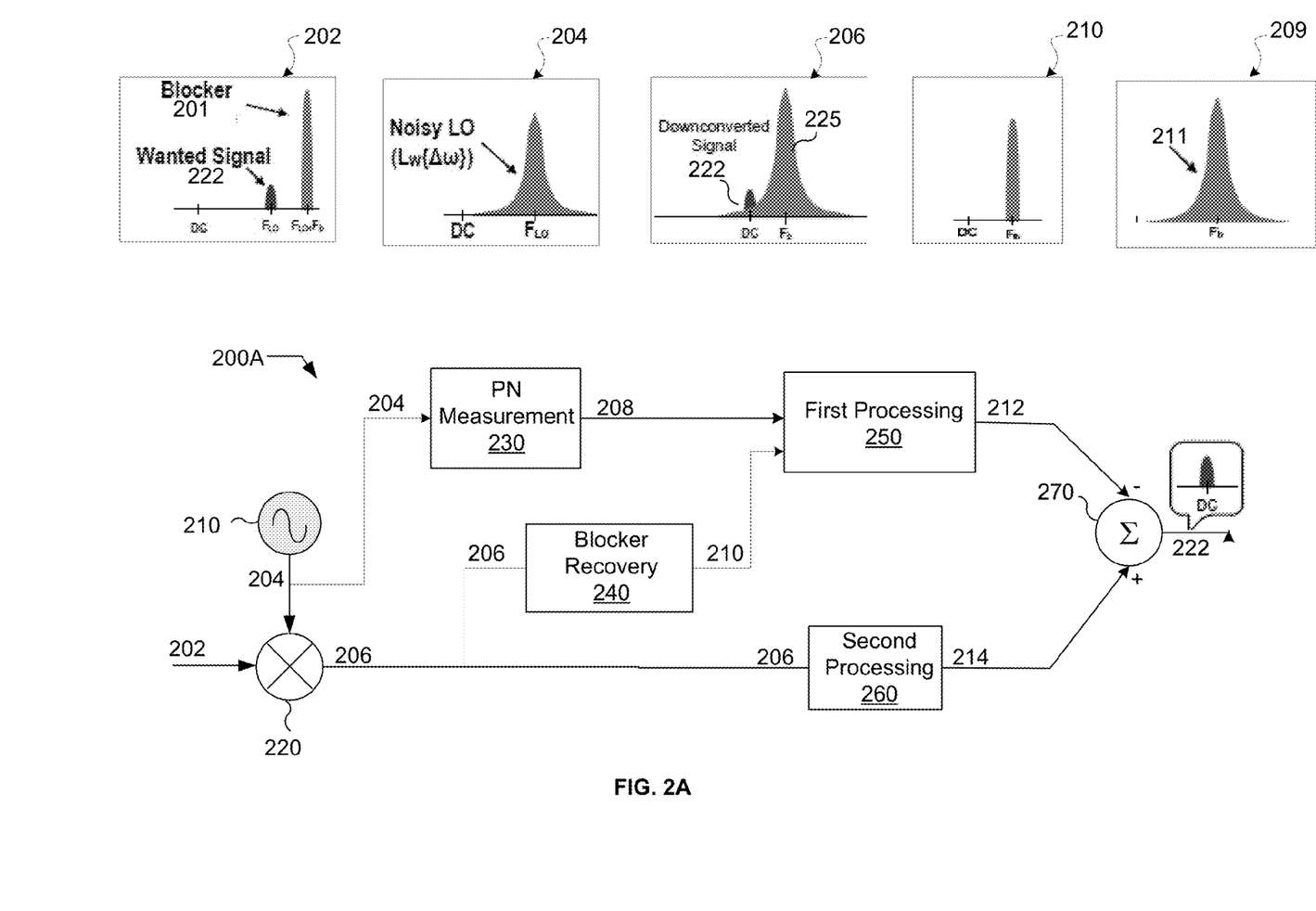
FIG. 2A illustrates an example system for reciprocal mixing noise cancellation in accordance with one or more implementations.

FIG. 2A illustrates an example system 200A for reciprocal mixing noise cancellation in accordance with one or more implementations. The system 200A may include a first mixer 220, a phase noise (PN) measurement module 230, a blocker recovery module 240, a first processing module 250, a second processing module 260, and a first subtraction module 270. An RF signal 202 may be down-converted to DC, by the first mixer 220, through mixing the RF signal 202 with a LO signal 204 to generate a baseband signal 206. The RF signal 202 may include a wanted signal 222 (e.g., desired signal) at LO frequency $F_{Lo}$ and a narrow-band blocker 201 (hereinafter "blocker 210") at an offset frequency $F_b$ from the $F_{Lo}$. The offset frequency $F_b$ corresponds to the frequency of the blocker after down conversion (e.g., blocker frequency). The LO signal 204 may be a noisy Lo signal with a phase noise frequency spectrum centered at the LO frequency $F_{Lo}$. The baseband signal 206 (hereinafter "signal 206") may include the wanted signal 222 down-converted to DC and a wideband modulated blocker signal 225 (hereinafter "modulated blocker 225") down-converted to blocker frequency $F_b$). The modulated blocker 225 is the product of mixing of the narrow blocker 201 with frequencies of the phase noise of the LO, and thus has a symmetrical frequency spectrum (e.g., profile) centered at $F_b$.

As discussed above with respect to FIG. 1, the tail of the modulated blocker 225 around DC may at least partially overlap (e.g., be in-band with respect to) the wanted signal 222. The overlapping portion of the modulated blocker 225, known as the reciprocal mixing noise, may be indistinguishable from the wanted signal 222. The system 200A may measure the phase noise of the LO and use the measured phase noise along with a blocker estimate signal to cancel the overlapping reciprocal mixing noise, as disclosed herein, and provide the wanted signal 222 substantially free from to the reciprocal mixing noise.

The blocker recovery module 240 may be configured to perform blocker recovery on the baseband signal 206 and generate the blocker estimate signal 210 (hereinafter "signal 210"). The PN measurement module 230 may be configured to measure the phase noise of the LO and generate a phase noise measurement signal 208 (hereinafter "signal 208"). At the first processing module 250, the signal 208 may be processed with the signal 210 to generate a reconstructed noise signal 212 (hereinafter "signal 212"). The processing at the processing module 250 may re-impose the phase noise profile (e.g., of the modulated blocker 225 of FIG. 2A) on the blocker estimate signal 210. In one or more aspects, the baseband signal 206 may be further processed in a second processing module 260 to adjust the level (e.g., amplitude) of the baseband signal 206. The processing in the second processing module 260 may also include filtering the adjusted baseband signal to generate a processed baseband signal 214 (hereinafter "signal 214"), which is a better match to the signal 212. The first subtraction module 270 may receive the signals 212 and 214 and subtract the signal 212 from signal 214 to generate the wanted signal 222 substantially without the reciprocal mixing noise.

In one or more aspects, the PN measurement module 230 may be implemented using a known delay-cell discriminator technique. In the delay-cell discriminator technique, an identical, but delayed version of the noisy LO signal (e.g., 204 of FIG. 2A) is generated and then compared with the original noisy LO signal to extract the phase noise of the LO. Any variations of delay-cell discriminator technique or other techniques may be used to implement the PN measurement module 230.

In one or more aspects, some or all of the blocks of the system 200A can be implemented in either analog or digital domain.

Figure 2B:
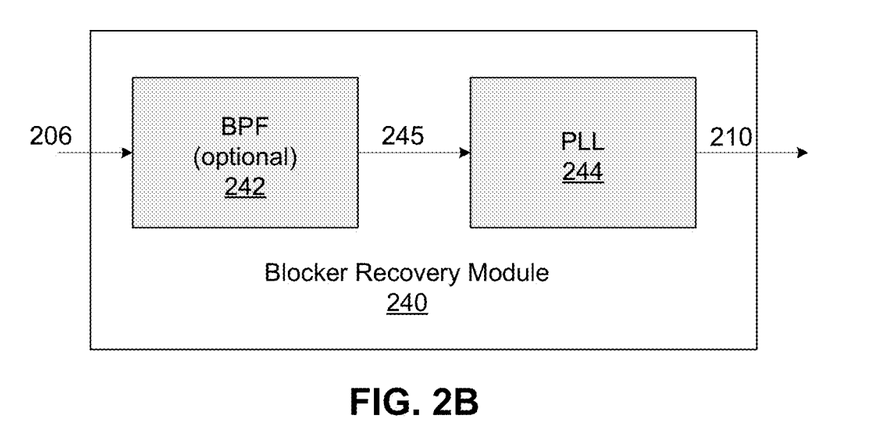
FIG. 2B illustrates an example blocker recovery module of the system of FIG. 2A in accordance with one or more implementations.

FIG. 2B illustrates an example blocker recovery module 240 of the system 200A of FIG. 2A in accordance with one or more implementations. The blocker recovery module 240 may include an optional band-pass filter 242, and a phase lock loop (PLL) 244. The band-pass filter 242 may be configured to have a pass band centered around the blocker frequency $F_b$ and to clean up the rest of the signal (e.g., the reciprocal mixing noise and the wanted signal) to form a filtered signal 245. The use of the band-pass filter 242 may be optional, but may improve the performance of the blocker recovery module 240. The filtered signal 245 may be used by the PLL 244 to lock to the blocker frequency $F_b$, and generate the signal 210, at a substantially precise frequency of $F_b$. The detailed description of the band-pass filter 242, and the PLL 246 are known in the art and, for the sake of brevity, are omitted from the discussion herein. In one or more aspects, some or all of the block of the block recovery module 240 can be implemented in either analog or digital domain.

Figure 2C:
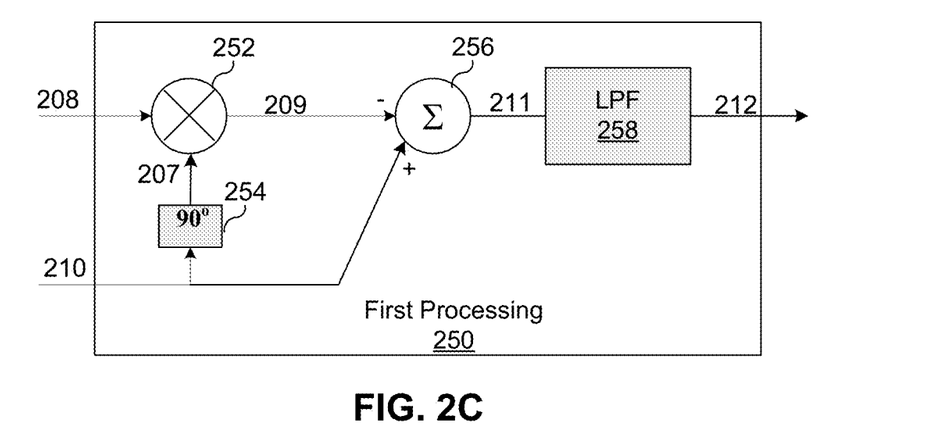
FIG. 2C illustrates an example of a first processing module of the system of FIG. 2A in accordance with one or more implementations.

FIG. 2C illustrates an example of a first processing module 250 of the system of FIG. 2A in accordance with one or more implementations. The first processing module 250 may include a mixer 252, a phase shifter 254, a second subtraction module 256, and a low-pass filter (LPF) 258. The phase shifter 254 may phase shift (e.g., by 90 degrees) the signal 210 (e.g., A cos(ωt), where ω represents the blocker frequency) to generate a phase shifted signal 207 (e.g., A sin(ωt)). In one or more aspect, instead of using the phase shifted signal 207, a quadrature phase version of the signal 210 (if available) can be applied to the mixer 252. At the mixer 252, the phase shifted signal 207 may be multiplied with the signal 208 (e.g., φ(t)) to generate a first processed signal 209, which has the form of: φ(t)*A cos(ωt). The second subtraction module 256 may be configured to subtract the first processed signal 209 (e.g., φ(t)*A cos(ωt)) from the signal 210 (e.g., A cos(ωt)) to generate the second processed signal 211 (e.g., A cos(ωt)−φ(t)*A cos(ωt)=A cos(ωt+φ(t)), for sufficiently small phase noise φ(t)). The expression A cos(ωt+φ(t)) may represent the blocker signal superimposed with LO phase noise, the DC portion of which is substantially the same as the reconstructed noise signal 212.

In order to remove the non-DC portions of the second processed signal 211, the LPF 258 may be utilized, which may be configured to have a proper cut-off frequency to remove the unwanted portions of the signal 211 and leave the reciprocal mixing noise portion intact. The output signal of the LPF 258 (e.g., the signal 212) is the reconstructed noise signal 212, which may be substantially the same as the reciprocal mixing noise. The detailed description of the mixer 252, the phase shifter 254, the second subtraction module 256, and the low-pass filter (LPF) 258 are known in the art and, for the sake of brevity, are omitted from the discussion herein. In one or more aspects, some or all of the block of the module 250 can be implemented in either analog or digital domain.

Figure 2D:
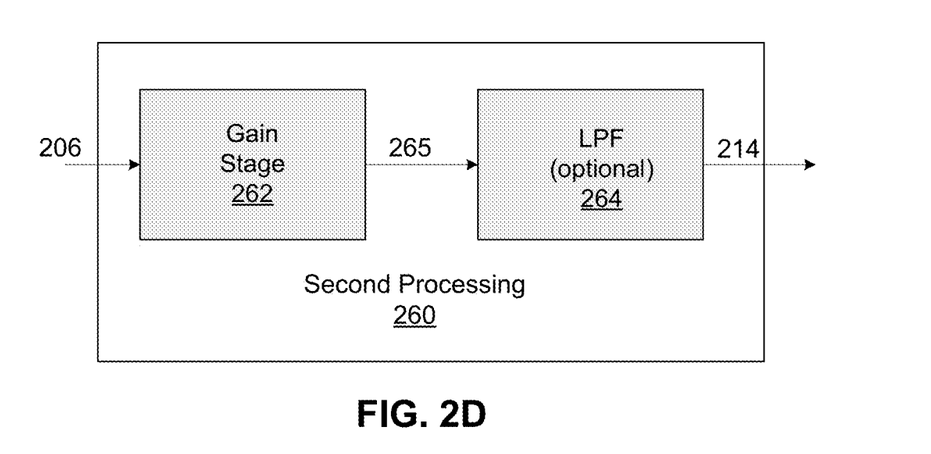
FIG. 2D illustrates an example second processing module of the system of FIG. 2A in accordance with one or more implementations.

FIG. 2D illustrates an example second processing module 260 of the system of FIG. 2A in accordance with one or more implementations. The second processing module 260 may include a gain stage 262 and a LPF 264. The gain stage 262 may be configured to adjust the level (e.g. amplitude) of the baseband signal 206 to a level matching the level of the reciprocal mixing noise in DC portion of the same in the second processed signal 211 and generate an amplified signal 265. The LPF 264 may be configured to remove additional noise components, such as the noise originated from the gain stage 262, and the modulated blocker portion of the baseband signal 206, which are beyond the in-band frequencies (e.g., frequencies in the bandwidth of the wanted signal 222), to generate a clean, properly matched and scaled signal 214. In an aspect, the LPF 264 may be combined with the gain stage 262. The detailed description of the gain stage 262 and the LPF 264 are known in the art and, for the sake of brevity, are omitted from the discussion herein. In one or more aspects, some or all of the block of the system 200A can be implemented in either analog or digital domain.

Figure 3:
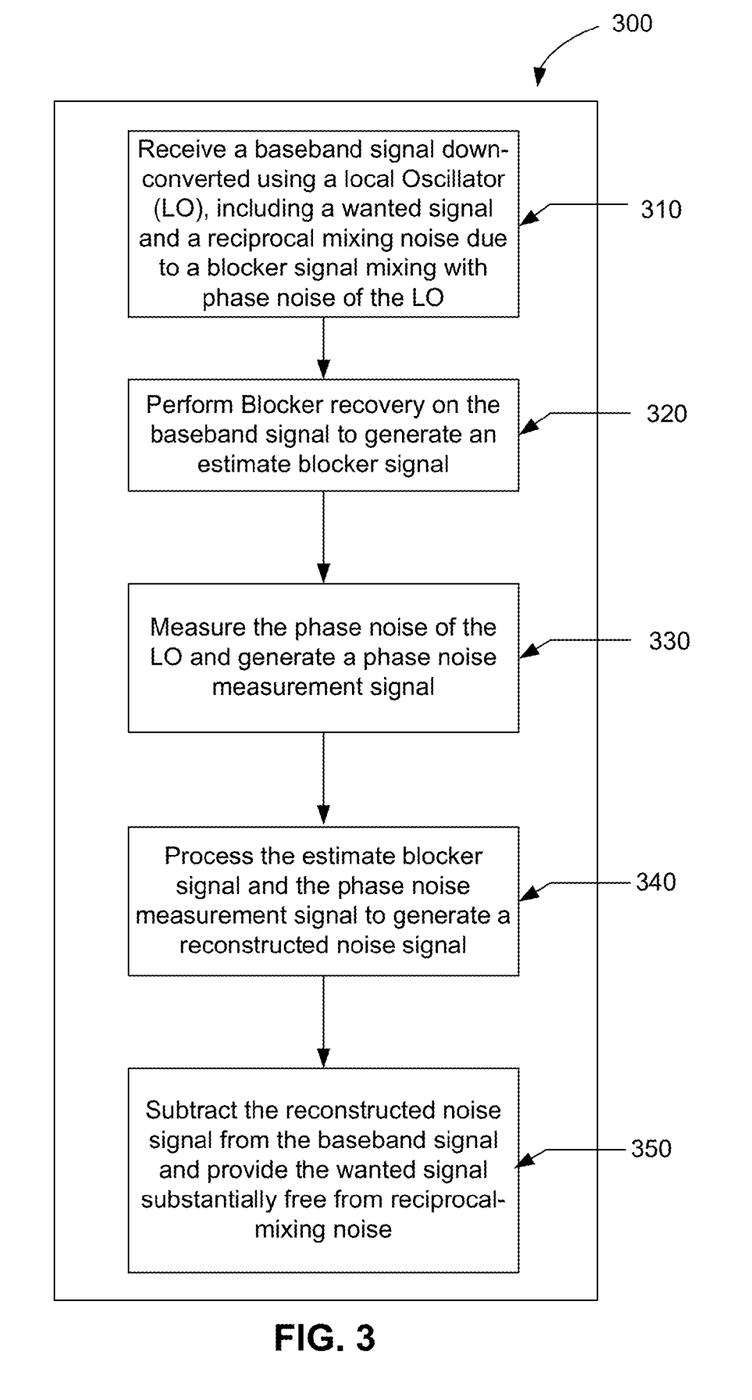
FIG. 3 illustrates a flow diagram of an example method for reciprocal mixing noise cancellation in accordance with one or more implementations.

FIG. 3 illustrates a flow diagram of an example method for reciprocal mixing noise cancellation in accordance with one or more implementations. For explanatory purposes, example method 300 is described herein with reference to the system 200A of FIG. 2A; however, example method 300 is not limited to the system 200A of FIG. 2A. Further for explanatory purposes, the blocks of example method 300 are described herein as occurring in serial, or linearly. However, multiple blocks of example method 300 may occur in parallel. In addition, the blocks of example method 300 need not be performed in the order shown and/or one or more of the blocks of example method 300 need not be performed.

Method 300 may start at operation 310, where the baseband signal 206 of FIG. 2A may be received from the down-conversion mixer 220 of FIG. 2A. The baseband signal 206 may comprise the wanted signal 222 of FIG. 2A at DC and the modulated blocker 225 at the blocker frequency $F_b$. The modulated blocker 225 may result from a reciprocal-mixing of an unwanted signal (e.g., a narrow band blocker such as 201 of FIG. 12A) with a phase noise (e.g., 104 of FIG. 2A). At least a portion of the modulated blocker 225 may overlap the wanted signal 222, adding a reciprocal-mixing noise to the wanted signal 222.

At operation 320, the blocker recovery module 240 of FIG. 2A may perform blocker recovery on the baseband signal 206 and may generate a blocker estimate signal (e.g., signal 210 of FIG. 2A), using the first signal 206. The signal 210 may be a narrow-band signal at the frequency of the blocker (e.g., frequency $F_b$). The phase noise measuring module 230 of FIG. 2A, at operation 330, may measure the phase noise of the LO and may generate a phase noise measurement signal (e.g., signal 208 of FIG. 2A) based on the measured phase noise of the LO.

At operation 340, the first processing module 250 of FIG. 2A may process the blocker estimate signal 210 and the phase noise measurement signal 208 and may generate a reconstructed noise signal (e.g., signal 212 of FIG. 2A). The reconstructed noise signal 212 may comprise the overlapping reciprocal mixing noise.

The first subtraction module 270 of FIG. 2A may be configured to subtract the reconstructed noise signal 212 from the baseband signal 206 (e.g., after further processing by the second processing module 260 of FIG. 2A) to provide the wanted signal 222 DC, substantially free from the reciprocal-mixing noise (operation 350).

Figure 4:
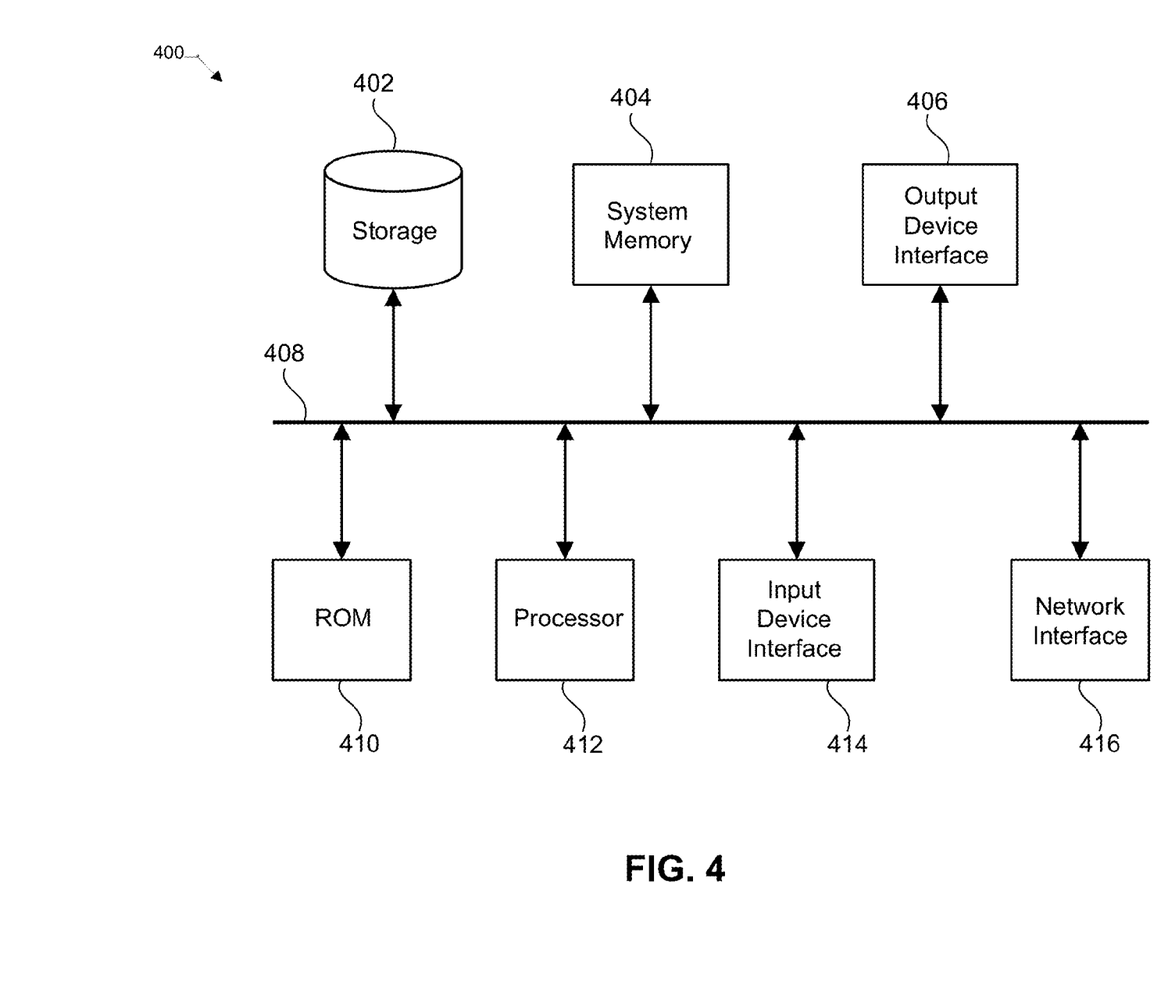
FIG. 4 conceptually illustrates electronic system with which some implementations of the subject technology may be implemented.

FIG. 4 conceptually illustrates an electronic system 400 with which some implementations of the subject technology may be implemented. Electronic system 400, for example, can be a desktop computer, a laptop computer, a tablet computer, a server, a switch, a router, a base station, a receiver, a phone, a personal digital assistant (PDA), or generally any electronic device that transmits signals over a network. Such an electronic system may include various types of computer readable media and interfaces for various other types of computer readable media. Electronic system 400 includes bus 408, processing unit(s) 412, system memory 404, read-only memory (ROM) 410, permanent storage device 402, input device interface 414, output device interface 406, and network interface 416, or subsets and variations thereof.

Bus 408 collectively represents all system, peripheral, and chipset buses that communicatively connect the numerous internal devices of electronic system 400. In one or more implementations, bus 408 communicatively connects processing unit(s) 412 with ROM 410, system memory 404, and permanent storage device 402. From these various memory units, processing unit(s) 412 retrieves instructions to execute and data to process in order to execute the processes of the subject disclosure. The processing unit(s) can be a single processor or a multi-core processor in different implementations.

ROM 410 stores static data and instructions that are needed by processing unit(s) 412 and other modules of the electronic system. Permanent storage device 402, on the other hand, is a read-and-write memory device. This device is a non-volatile memory unit that stores instructions and data even when electronic system 400 is off. One or more implementations of the subject disclosure use a mass-storage device (such as a magnetic or optical disk and its corresponding disk drive) as permanent storage device 402.

Other implementations may use a removable storage device (such as a floppy disk, flash drive, and its corresponding disk drive) as permanent storage device 402. Like permanent storage device 402, system memory 404 is a read-and-write memory device. However, unlike storage device 402, system memory 404 is a volatile read-and-write memory, such as random access memory. System memory 404 stores any of the instructions and data that processing unit(s) 412 needs at runtime. In one or more implementations, the processes of the subject disclosure are stored in system memory 404, permanent storage device 402, and/or ROM 410. From these various memory units, processing unit(s) 412 retrieves instructions to execute and data to process in order to execute the processes of one or more implementations.

Bus 408 also connects to input and output device interfaces 414 and 406. Input device interface 414 enables a user to communicate information and select commands to the electronic system. Input devices used with input device interface 414 include, for example, alphanumeric keyboards and pointing devices (also called "cursor control devices"). Output device interface 406 enables, for example, the display of images generated by electronic system 400. Output devices used with output device interface 406 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touch-screen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 4, bus 408 may also couple electronic system 400 to a network (not shown) through network interface 416. In this manner, the computer can be a part of a network of computers (such as a local area network ("LAN"), a wide area network ("WAN"), or an Intranet, or a network of networks, such as the Internet. Any or all components of electronic system 400 can be used in conjunction with the subject disclosure.

Many of the above-described features and applications may be implemented as software processes that are specified as a set of instructions recorded on a computer readable storage medium (alternatively referred to as computer-readable media, machine-readable media, or machine-readable storage media). When these instructions are executed by one or more processing unit(s) (e.g., one or more processors, cores of processors, or other processing units), they cause the processing unit(s) to perform the actions indicated in the instructions. Examples of computer readable media include, but are not limited to, RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. In one or more implementations, the computer readable media does not include carrier waves and electronic signals passing wirelessly or over wired connections, or any other ephemeral signals. For example, the computer readable media may be entirely restricted to tangible, physical objects that store information in a form that is readable by a computer. In one or more implementations, the computer readable media is non-transitory computer readable media, computer readable storage media, or non-transitory computer readable storage media.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, and methods described herein may be implemented as electronic hardware, computer software, or combinations of both. To illustrate this interchangeability of hardware and software, various illustrative blocks, modules, elements, components, and methods have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method for reciprocal mixing noise cancellation, the method comprising:
   receiving a baseband signal down-converted to baseband using a local oscillator (LO), the baseband signal comprising a wanted signal and a reciprocal mixing noise, at least partially overlapping the wanted signal, the reciprocal mixing noise being due to mixing of a blocker signal with a phase noise of the LO during down-conversion;
   performing blocker recovery on the baseband signal and generating a blocker estimate signal from the baseband signal;
   measuring the phase noise of the LO and generating a phase noise measurement signal based on the measured phase noise of the LO;
   processing the blocker estimate signal and the phase noise measurement signal and generating a reconstructed noise signal comprising the overlapping reciprocal mixing noise; and
   subtracting the reconstructed noise signal from the baseband signal and providing the wanted signal substantially free from to the reciprocal mixing noise.

2. The method of claim 1, wherein processing the blocker estimate signal and the phase noise measurement signal comprises:

phase shifting the blocker estimate signal; and multiplying the phase shifted blocker estimate signal by the phase noise measurement signal and generating a first processed signal, wherein phase shifting the blocker estimate signal comprises phase shifting of the blocker estimate signal by approximately 90 degrees or using a quadrature phase version of the blocker estimate signal.

3. The method of claim 2, wherein processing the blocker estimate signal and the phase noise measurement signal further comprises:

subtracting the first processed signal from the blocker estimate signal and generating a second processed signal; and filtering the second processed signal and generating the reconstructed noise signal.

4. The method of claim 1, wherein performing blocker recovery on the baseband signal comprises using at least one of a phase-locked loop or a band-pass filter.

5. The method of claim 1, wherein performing blocker recovery on the baseband signal further comprises filtering the baseband signal using a band-pass filter having a pass-band centered at a frequency of the blocker signal.

6. The method of claim 5, wherein performing blocker recovery on the baseband signal further comprises applying the filtered baseband signal to a phased-locked loop that locks to the frequency of the blocker signal.

7. The method of claim 1, further comprising amplifying the baseband signal, and wherein subtracting the reconstructed noise signal from the baseband signal comprises subtracting the reconstructed noise signal from the amplified baseband signal.

8. The method of claim 7, further comprising filtering the amplified baseband signal and generating a processed baseband signal, and wherein subtracting the reconstructed noise signal from the baseband signal comprises subtracting the reconstructed noise signal from the processed baseband signal.

9. The method of claim 1, wherein the measuring the phase noise of the LO comprises measuring the phase noise of the LO using a delay-cell discriminator technique.

10. A system for reciprocal mixing noise cancellation, the system comprising:

a blocker recovery module configured to perform blocker recovery on a baseband signal to generate a replica of a blocker signal, the baseband signal down-converted to baseband using a local oscillator (LO), and comprising a wanted signal and a reciprocal mixing noise, at least partially overlapping the wanted signal, the reciprocal mixing noise being due to mixing of a blocker signal with a phase noise of the LO during down-conversion;

a phase noise measurement module configured to measure the phase noise of the LO and to generate a phase noise measurement signal based on the measured phase noise of the LO;

a first processing module configured to process the blocker estimate signal and the phase noise measurement signal to generate a reconstructed noise signal comprising the overlapping reciprocal mixing noise; and a first subtraction module configured to subtract the reconstructed noise signal from the baseband signal to provide the wanted signal substantially free from to the reciprocal mixing noise.

11. The system of claim 10, wherein the first processing module comprises:

a phase shifter to shift the blocker estimate signal; and a mixer configured to multiply the phase shifted blocker estimate signal by the phase noise measurement signal and to generate a first processed signal, wherein:

the phase shifter is configured to phase shift the blocker estimate signal by approximately 90 degrees, or the phase shifter is removed and a quadrature phase version of the blocker estimate signal is used as the shifted blocker estimate signal.

12. The system of claim 11, wherein the first processing module further comprises:

a second subtraction module configured to subtract the first processed signal from the blocker estimate signal and to generate a second processed signal; and a low pass filter configured to filter the second processed signal and to generate the reconstructed noise signal.

13. The system of claim 10, wherein the blocker recovery module comprises at least one of a phase-locked loop or a band-pass filter.

14. The system of claim 10, wherein the blocker recovery module comprises a band-pass filter, and wherein a pass-band of the band-pass filter is centered at a frequency of the blocker signal.

15. The system of claim 14, wherein the blocker recovery module further comprises a phased-locked loop configured to lock to the frequency of the blocker signal.

16. The system of claim 10, further comprising a second processing module that comprises a gain stage configured to amplify the baseband signal to generate an amplified baseband, and wherein the first subtraction module is configured to subtract the reconstructed noise signal from the amplified baseband signal.

17. The system of claim 16, wherein the second processing module further comprises a low-pass filter configured to filter the amplified baseband signal to generate a processed baseband signal, and wherein the first subtraction module is configured to subtract the reconstructed noise signal from the processed baseband signal.

18. The system of claim 10, wherein the phase noise measurement module is configured to measure the phase noise of the LO using a delay-cell discriminator technique.

19. A non-transitory machine-readable medium embodying instructions that, when executed by a machine, allow the machine to perform a method for reciprocal-mixing noise cancellation, the method comprising:

receiving a baseband signal down-converted to baseband using a local oscillator (LO), the baseband signal comprising a wanted signal and a reciprocal mixing noise, at least partially overlapping the wanted signal, the reciprocal mixing noise being due to mixing of a blocker signal with a phase noise of the LO during down-conversion;

performing blocker recovery on the baseband signal and generating a blocker estimate signal from the baseband signal;

measuring the phase noise of the LO and generating a phase noise measurement signal based on the measured phase noise of the LO;

processing the blocker estimate signal and the phase noise measurement signal and generating a reconstructed noise signal comprising the overlapping reciprocal mixing noise; and subtracting the reconstructed noise signal from the baseband signal and providing the wanted signal substantially free from to the reciprocal mixing noise.

20. The non-transitory machine-readable medium of claim 19, wherein:

a) processing the blocker estimate signal and the phase noise measurement signal comprises:
- a1) multiplying a phase shifted blocker estimate signal by the phase noise measurement signal and generating a first processed signal;
- a2) subtracting the first processed signal from the blocker estimate signal and generating a second processed signal; and
- a3) filtering the second processed signal and generating the reconstructed noise signal, b) performing blocker recovery on the baseband signal comprises using at least one of a phase-locked loop or a band-pass filter, c) performing blocker recovery on the baseband signal further comprises filtering the baseband signal using a band-pass filter centered at a frequency of the blocker signal, d) performing blocker recovery on the baseband signal further comprises applying the filtered baseband signal to a phased-locked loop that locks to the frequency of the blocker signal.

\* \* \* \* \*